(No Model.) 3 Sheets—Sheet 2.
W. J. FENDER.
MIDDLINGS PURIFIER.
No. 379,155. Patented Mar. 6, 1888.
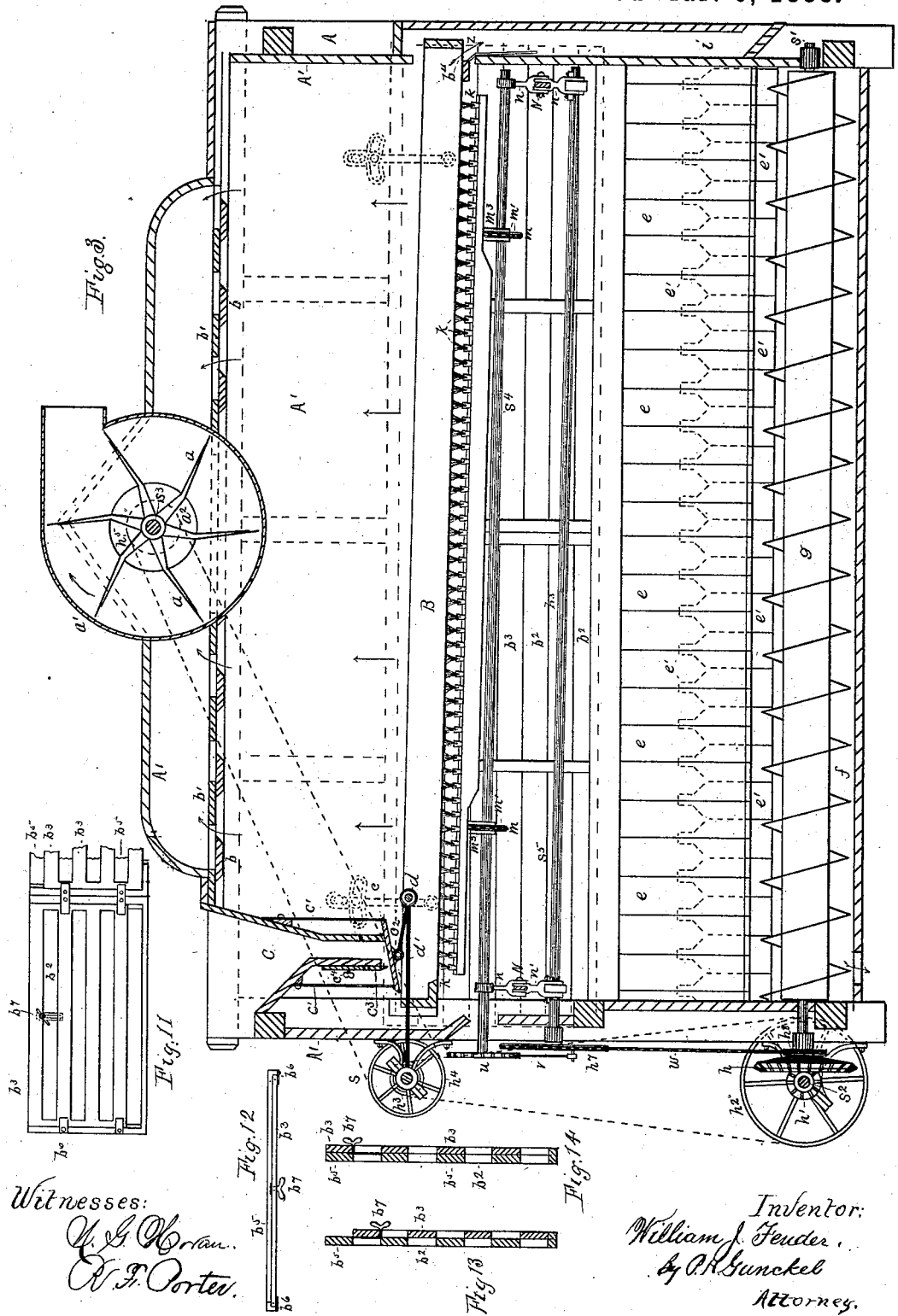
Witnesses:
Inventor:
William J. Fender
by O. H. Gunckel
Attorney.

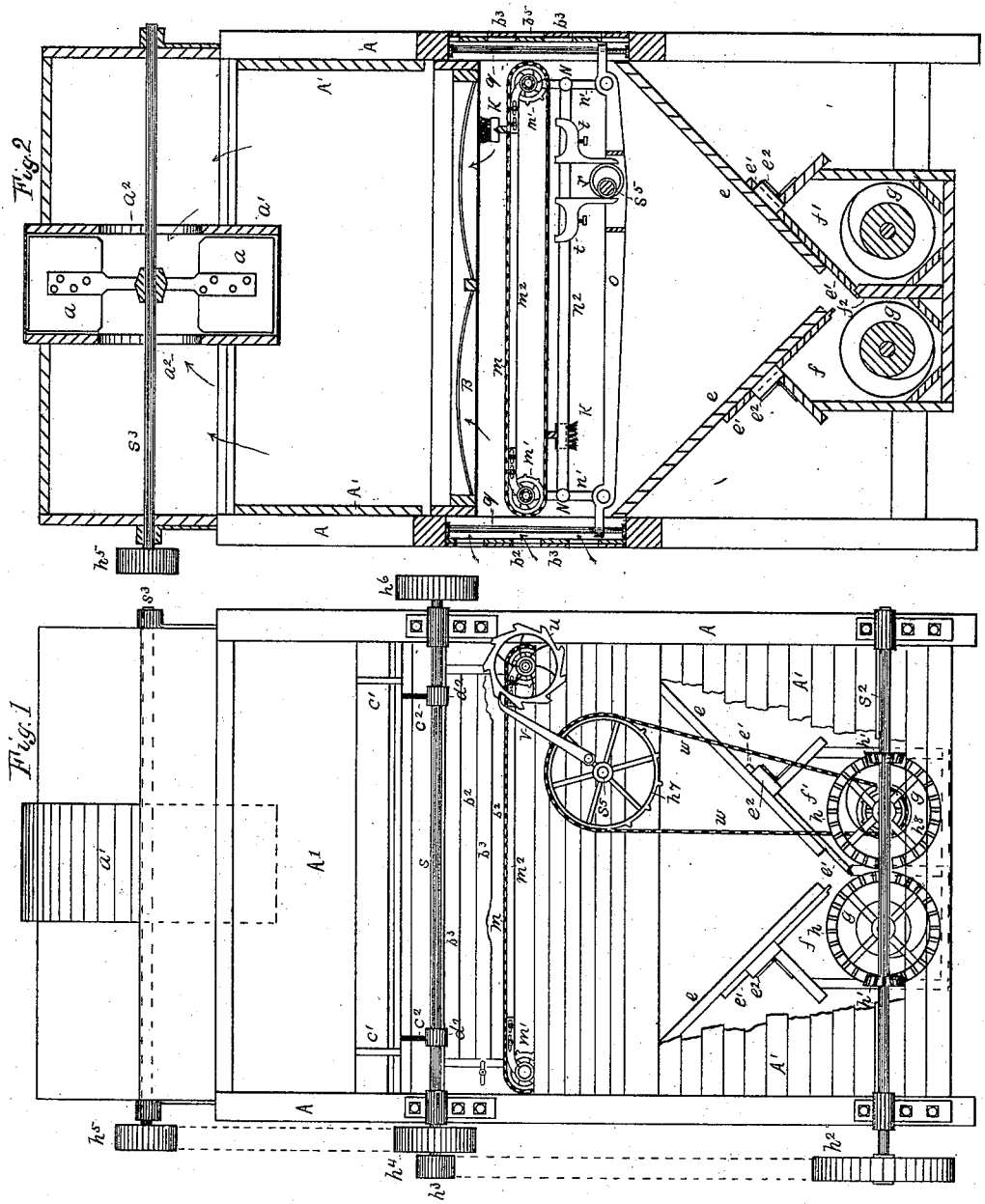

(No Model.) 3 Sheets—Sheet 3.
W. J. FENDER.
MIDDLINGS PURIFIER.
No. 379,155. Patented Mar. 6, 1888.
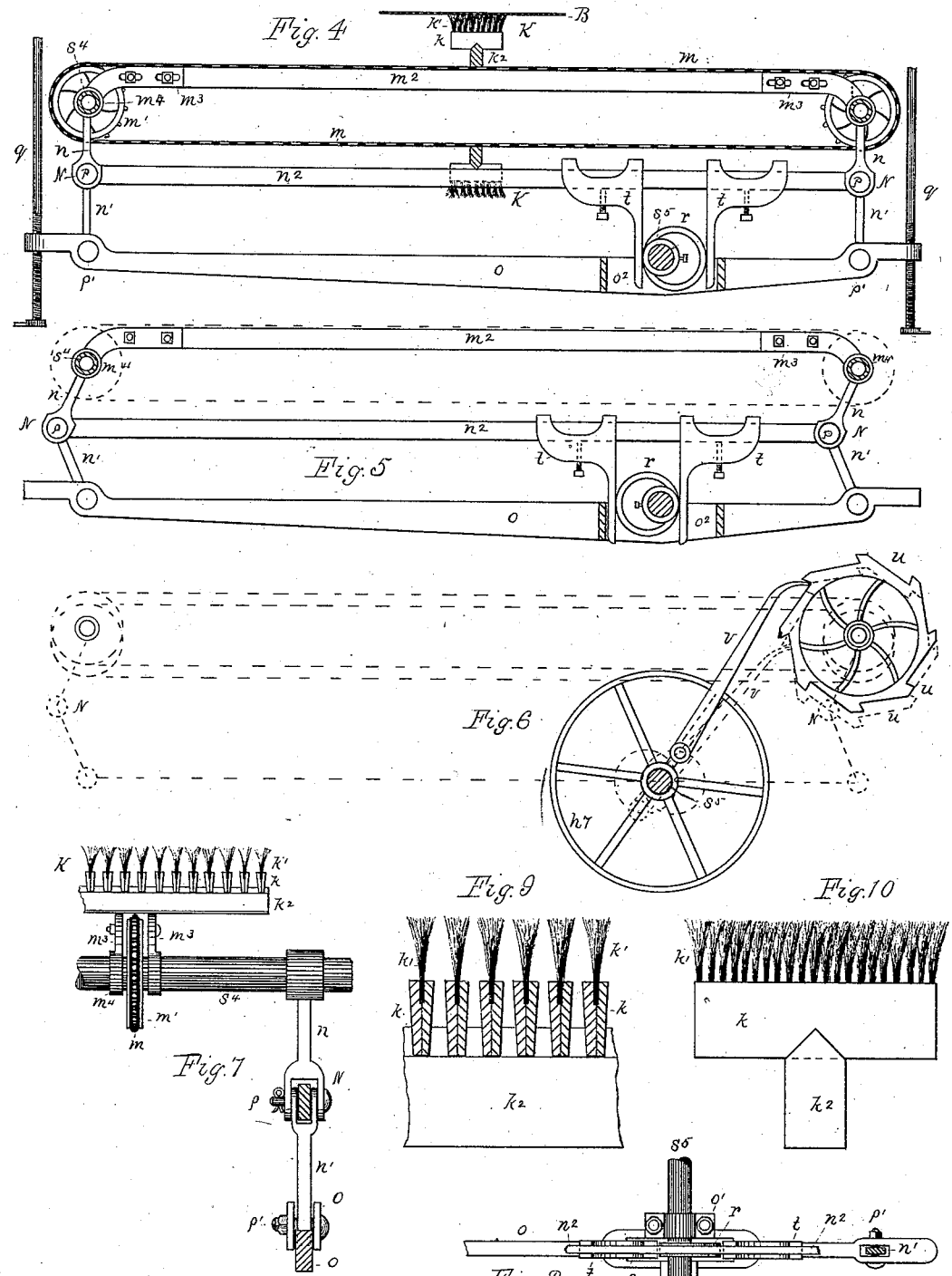
Witnesses:
U. G. Moran.
R. F. Porter.
Inventor:
William J. Fender.
By P. H. Gunckel.
Attorney.

UNITED STATES PATENT OFFICE.

WILLIAM J. FENDER, OF JACKSON, MICHIGAN, ASSIGNOR TO EDWARD P. ALLIS & CO., OF MILWAUKEE, WISCONSIN.

MIDDLINGS-PURIFIER.

SPECIFICATION forming part of Letters Patent No. 379,155, dated March 6, 1888.

Application filed September 20, 1886. Serial No. 213,994. (No model.)

*To all whom it may concern:*

Be it known that I, WILLIAM J. FENDER, a citizen of the United States, and a resident of Jackson, in the county of Jackson and State of Michigan, have invented certain new and useful Improvements in Middlings Purifiers, of which the following is a specification.

My invention relates to the class of middlings-purifiers in which the middlings are fed upon a shaking screen and an upward current of air is passed through the machine, and in which a traveling brush or brushes are used to remove adhering particles from the screen.

The principal object of the invention is the improvement of the screen-cleaning devices; and the invention consists, mainly, in an improvement in the cleaning devices and in mechanism for subjecting the screen to the brush action intermittingly and for moving the brushes to other portions of the screen while not in contact with the screen.

The invention is illustrated in the accompanying drawings, in which—

Figure 1 is a partly-broken front view of the machine. Fig. 2 is a transverse sectional view of the machine. Fig. 3 is a longitudinal sectional view of the same; and Figs. 4 to 8, inclusive, are detail views of the brush-carrying devices, which will be hereinafter fully described. Figs. 9 and 10 are details of the brushes, and Figs. 11 to 14 are details of the valve devices for the air-inlets.

A is the frame of the machine, and A' its casing.

$a$ is a suction-fan within the fan-case $a'$ at the top of the machine.

$b\ b$ are valves for regulating the volume of air passing through the ports $b'$ to the fan. The air is admitted to the machine through openings $b^2$ at its sides, and the valves or slides $b^3$ are used to regulate the quantity of air admitted through the openings. The air is sucked by the fan action into the machine through the openings $b^2$, and thence upward through the screen to the eyes $a^2$ of the fan-case, as indicated by arrows. The valves and the ports which they control are provided in detachable frames at the sides of the machine, which are held by catches, and which can be entirely removed when access to the interior of the machine is desired.

The frames have horizontal slats $b^5$, suitably spaced to form the ports $b^2$, and other slats on frames which slide under guides $b^6$ constitute the valves $b^3$. The frames, with the valves $b^3$, are vertically adjustable and are held in adjustment by thumb-screws $b^7$. A similar arrangement of ports and valves may also be provided at the front end of the machine.

The middlings are fed upon the screen B through a hopper, C.

$c$ is the feed-shoe, suspended on hangers $c'$, which allow the shoe to be reciprocated, and $c^2$ is a rod connected to the shoe $c$ and to a cross-bar, $d$, attached to the shaker-frame, by means of which the shoe is made to reciprocate with the screen. A sliding valve, $c^3$, held by a thumb-screw, $c^4$, enables the feed to be regulated. The screen B is reciprocated longitudinally by means of eccentrics $d^2$ on the driving-shaft $s$, which eccentrics operate eccentric-rods $d'$, connected to the cross-bar $d$. The middlings fed upon the screen, which is placed at a slight inclination toward the rear of the machine, as is customary, pass over and through the screen, and are subjected to the upward draft through the screen created by the fan, for the purpose of freeing the middlings of light particles, fuzz, &c. The tailings pass from the screen over its end through an opening, $b^4$, as indicated by the arrow $z$, into a spout, $i$, by which they are conducted away from the machine.

The portion of the middlings falling through the screen drops upon the inclined gather-boards $e$, by which it is directed toward the conveyer-troughs $f f'$ at the middle of the machine.

Slides or valves $e'$ at the outside of the boards $e$ may be raised or lowered in their guides $e^2$ for opening or closing the ports to the troughs $f f'$, respectively. The ends of the slides, when lowered, rest upon the head of the partition $f^2$ between the conveyer-troughs, and those thus lowered direct the middlings into the opposite troughs. Conveyers $g$ carry away the matter falling into their respective troughs. The conveyers are carried by shafts $s'$, on which are beveled gear-wheels $h$, operated by beveled pinions $h'$ on a transverse shaft, $s^2$, at the head of the machine. The shaft $s^2$ is run by a pulley, $h^2$, belted to a pinion, $h^3$, on the driving-shaft $s$. A pulley, $h^4$, on the shaft $s$ is belted to a pulley, $h^5$, on the fan-shaft $s^3$ for operating the fan. The power for running the driving-shaft $s$ is applied to the pulley $h^6$.

For freeing the screen of adhering matter there is provided a brush or brushes, K, carried by endless chains or belts $m$, running transversely in the machine, or by other suitable mechanism.

A brush or brushes of any suitable construction may be used for the purpose; but a brush of substantially the following character is deemed preferable:

$k$ is the brush-stock, which is preferably formed of two thin pieces of wood grooved along one edge and put together with their grooves coincident, forming a longitudinal slot for receiving the bristles; but obviously the stock may be of a single piece grooved along its upper surface or perforated, as in the customary mode of manufacturing brushes. The bristles $k'$ are inserted either in tufts, as shown in the drawings, or in continuous courses in the slot of the stock, and the two pieces are then secured by glue or otherwise, clamping the bristles between them.

The stock may be of any convenient length, and after the bristles have been inserted it can be cut into sections of proper length for the width of the brush to be formed. These sections are then secured in the upper surface of a bar, $k^2$, which is attached to the chains and serves as the brush-carrier in the machine.

The upper surface of the bar should be angular or rounded to prevent the accumulation of dust and middlings upon it.

The chains $m$ are operated by chain-wheels $m'$ on the shafts $s^1$, which are placed lengthwise in the machine and which are preferably hollow to combine strength and lightness. The brushes and chains are prevented from sagging by cross-bars $m^2$, serving as ways over which the chains carrying the brushes slide. These cross-bars are supported at their ends and held up to the plane of the chain-wheels $m'$ by bent arms $m^3$, having rings $m^4$, fitting around the shafts $s^4$ on either side of the chain-wheel $m'$.

The shafts $s^4$ are mounted on toggle-joints composed of upper pieces, $n$, and lower pieces, $n'$, jointed at N. The joints N at opposite sides of the machine are connected by bars $n^2$, whose ends are pivoted in the central recesses of the joints by the pins $p$, which connect the pieces $n$ $n'$, and the bars $n^2$ serve to move the opposite joints N N in and out simultaneously. The lower ends of the joint-pieces $n'$ are connected by pivot-pins $p'$ in recesses in bridge-trees $o$. The bridge-trees are supported and are vertically adjustable by means of screws $q$, which have end bearings on the girts of the frame A.

$s^5$ is a shaft extending lengthwise in the machine and carrying a chain-wheel, $h^7$, at the head of the machine, and is run by a chain, $w$, from a wheel, $h^8$, on one of the conveyer-shafts, $s'$.

$o'$ $o'$ are the boxes on the bridge-trees for the shaft $s^5$. On the shaft $s^5$ are eccentric wheels $r$, which rotate in vertical slots $o^2$ in the bridge-trees.

$t$ $t$ are tappets bolted to the cross-bars $n^2$ and extending downward into the slots $o^2$ on either side of the eccentric wheels $r$ for reciprocating the bars $n^2$ and operating the toggle-joints by means of the throws of the eccentric. The forward throws of the eccentric wheels, as shown in Fig. 4, operate the tappets and the bar $n^2$, which carries them, so as to straighten the toggle-joints and so raise the brushes to the screen. The brushes remain in contact with the screen, which vibrates over brushes until the eccentrics in their return movements retract the tappets and cause the bending of the toggle-joints and consequent lowering of the brushes, as shown in Fig. 5.

To advance the brushes, there is provided on one of the shafts, $s^4$, a ratchet-wheel, $u$, which is operated by a pawl, $v$, pivoted to one of the spokes of the chain-wheel $h^7$, so that the pawl will engage the ratchet-wheel to turn it during only a small portion of the rotation of the wheel $h^7$, and the pawl is placed on the wheel in such position relatively to the eccentric throws that the pawl will operate the ratchet-wheel to advance the brushes at times when the backward throw of the eccentrics has bent the toggle-joints and lowered the brushes from the screen.

It will be obvious from the operations of the mechanisms described that the brushes will be presented to the screen at intervals and will be advanced periodically when not in contact with the screen.

It is deemed desirable that the brushes travel transversely in the machine to prevent the mingling of middlings of different grades, for by the transverse movement of the brushes any material accumulating upon them will be deposited with the material, passing through a given number of cloth, and thus a mixture of grades avoided.

One of the advantages gained by the recurrent withdrawal and presentation of the brushes is that during the periods of withdrawal the bristles of the brushes erect themselves and enable the function of the brushes to be more effectually performed by their intermittent contact with the screen than when they are made to scrape the surface of the screen continuously, as in the customary methods; and a further advantage of such operation of the brushes is that as they are successively thrust upward against the screen the straightened bristles are enabled to enter the meshes of the screen to loosen adhering matter, so that it may be operated upon by the fan-draft.

I am aware that it has been proposed to place beneath the sieve a coarse screen connected with suitable mechanism for periodically lifting it up into contact with the under face of the sieve, and then lowering it out of such contact. This I do not claim, the action of my clearing-brush being essentially different from that of the clearing-screen mentioned, which, coming into contact with the whole under face of the sieve at once, must interfere more or less with the free passage of air through it, and can in no event clear the meshes of the sieve in the same manner as do the fine bristles of my brush. The throw of the eccentrics by which the sieve is reciprocated is very short, and when the brush is lifted up its bristles enter and pass entirely through the meshes of the sieve, carrying before them the adhering particles which are not reached either by a clearing-screen or by the ordinary sweeping-brushes. The bristles, after entering the meshes, partake of the motion of the sieve, but otherwise remain at rest during their elevation, whereas under former constructions the brush has been made to travel against and to sweep the under face of the sieve while in working position, from which it has resulted that the bristles have not entered and could not enter the meshes of the sieve, but have merely swept over the face of the sieve, causing the flour particles to smear and in many cases to effectually close the meshes, particularly in damp weather or in purifying damp flour. Owing to this smearing or impasting effect the ordinary traveling brush has been found very unsatisfactory at times, and at no time entirely effective, though undoubtedly serving a good purpose ordinarily. The peculiar action of my brush, however, especially adapts it to the work to be performed, there being no wiping or smearing action whatever and the bristles reaching and removing adhering particles in positions inaccessible to any clearing device heretofore used, so far as I am aware.

In machines having brushes carried by endless belts traveling continuously in one direction each brush of course is periodically carried into and out of contact with the sieve, but from the commencement to the termination of such contact the brush sweeps over the sieve across the threads of its cloth, the bristles lying either flatly or obliquely against the sieve-clothing and not entering or passing through the meshes thereof. In fact, so far as a long and intimate acquaintance with the subject of middlings-purifiers has enabled me to ascertain, no brush heretofore used to sweep the sieve has had bristles adapted to enter and pass through the meshes of a purifier-sieve. To this peculiar mode of action, and to the employment of mechanism which advances the bristles endwise toward the sieve, holds the brush at rest while the sieve reciprocates, withdraws the brush from contact with the sieve, and finally shifts the brush to a position opposite another portion of the sieve while out of contact therewith, is to be attributed the successful operation of my brush in all kinds of weather and with all classes and conditions of flour and middlings.

The brush-carrying chains under the construction shown travel always in one and the same direction, and consequently after traversing across the face of the sieve from one side or end to the other the brushes pass back beneath their carrying-shafts to the side or end of the sieve first acted upon, and which has had time to again become clogged sufficiently to require cleaning, instead of unduly wearing the sieve by traveling directly back over the portion of the surface just cleaned.

It is obvious that other mechanical devices than those shown may be adopted for moving the guides toward and from the sieve or screen, and hence I do not mean to be understood as restricting my claims to the specific devices shown. Any mechanism now known and recognized as the equivalent of the toggles for imparting a to-and-fro motion to the guides may be substituted therefor.

As to all features or parts herein described and shown, but not claimed, I reserve the right to make separate application.

What I claim, and desire to secure by Letters Patent, is—

1. The combination, in a middlings-purifier, of a shaking sieve or screen, a brush movable in the direction of the length of its bristles toward and from the sieve, and means, substantially such as shown and described, for thus moving the brush.

2. The combination, with a sieve or screen, of a brush, a guide for said brush, a support bearing against said guide and movable toward and from the sieve, and actuating mechanism, substantially such as shown and described, adapted to advance and recede the support and guide, and thereby to advance and recede the brush toward and from the sieve.

3. The combination, with a sieve or screen, of a brush or brushes, an endless carrier therefor, a rotary shaft supporting the carrier, guides or ways to support the brush-stock, a lifting device beneath the guides or ways, a dog or pawl connected with said lifting device, and a ratchet-wheel secured upon the carrier-shaft and in the path of movement of the dog, said parts being combined and arranged to operate substantially as set forth, whereby the brush is caused to advance toward the sieve, then to move away therefrom, and while out of contact therewith to shift laterally.

4. In combination with the screen of a middlings-purifier, a brush or brushes, mechanism for moving the brushes, guides or ways for said brushes, supports for said guides, and eccentrics connected with a moving part of the purifier and serving to raise and lower the supports and guides.

5. In combination with the screen of a middlings-purifier, a brush or brushes, chains connected therewith, shafts and sprockets for operating said chains, a ratchet-wheel carried by one of said shafts, and a pawl connected with a moving part of the machine and serving to impart a step-by-step motion to the chains and brush or brushes always in the same direction, substantially as set forth, whereby the brush is caused to move from one boundary of the sieve to another by a series of steps with intermediate periods of rest.

6. In combination with a screen, a brush or brushes, chains for operating the same, sprockets and shafts therefor, toggle-joints supporting said shafts, cross-bars connecting opposite toggle-joints, tappets on said bars, eccentrics for operating said tappets, and a ratchet-and-pawl mechanism for turning said shafts, substantially as set forth.

WILLIAM J. FENDER.

Witnesses:
M. W. BORGHOLTHAUS,
P. H. GUNCKEL.